Feb. 1, 1944.   E. F. ZAP   2,340,446
AILERON CONTROL
Filed July 7, 1941   2 Sheets-Sheet 1
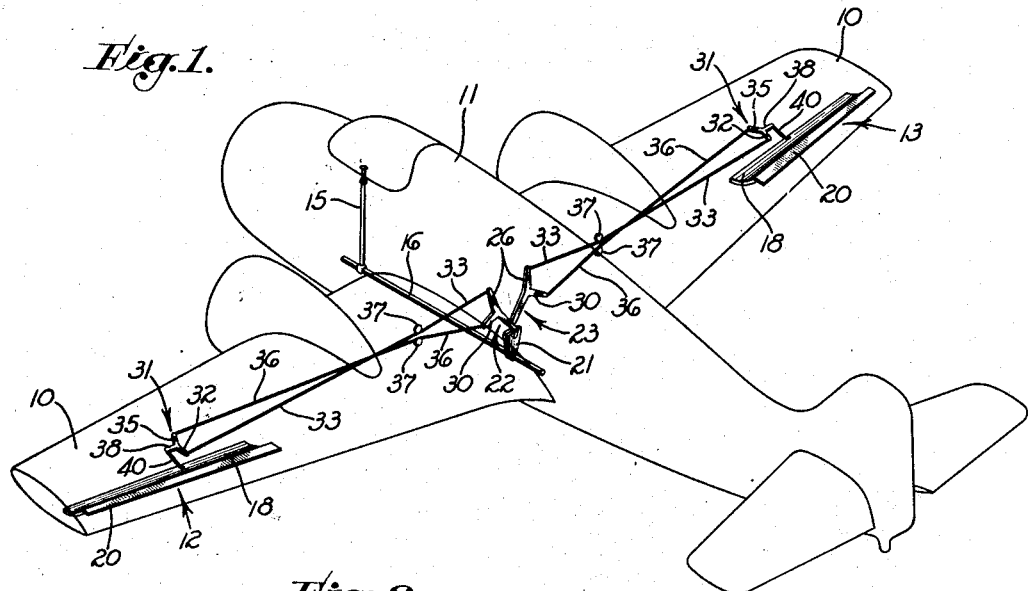
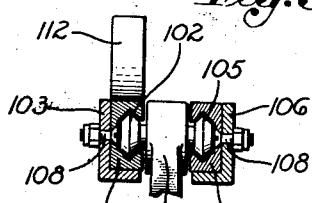
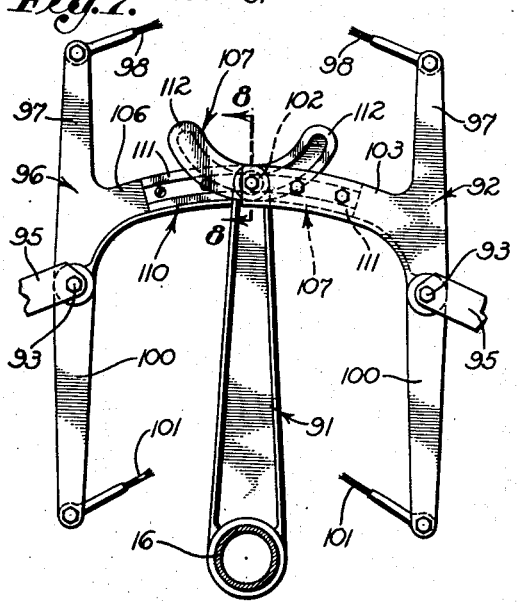
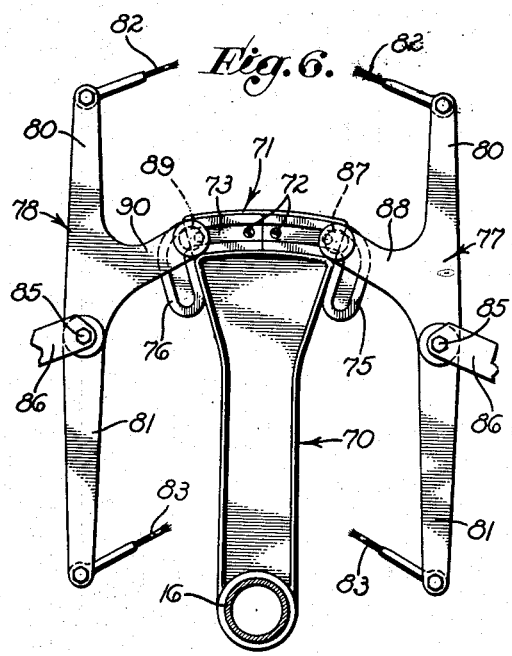
INVENTOR
EDWARD F. ZAP
BY
HARRIS, KIECH, FOSTER & HARRIS
FOR THE FIRM
ATTORNEYS Feb. 1, 1944.  E. F. ZAP  2,340,446
AILERON CONTROL
Filed July 7, 1941  2 Sheets-Sheet 2
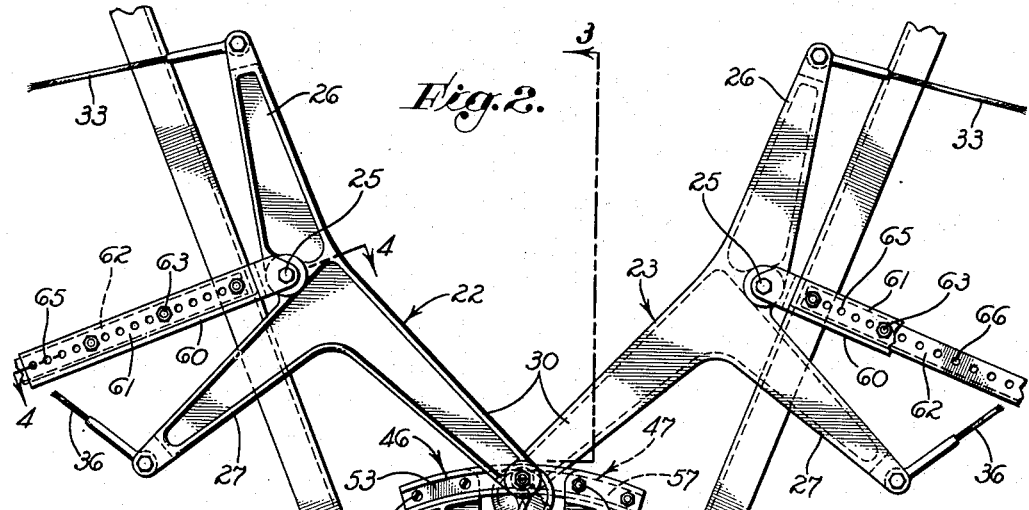
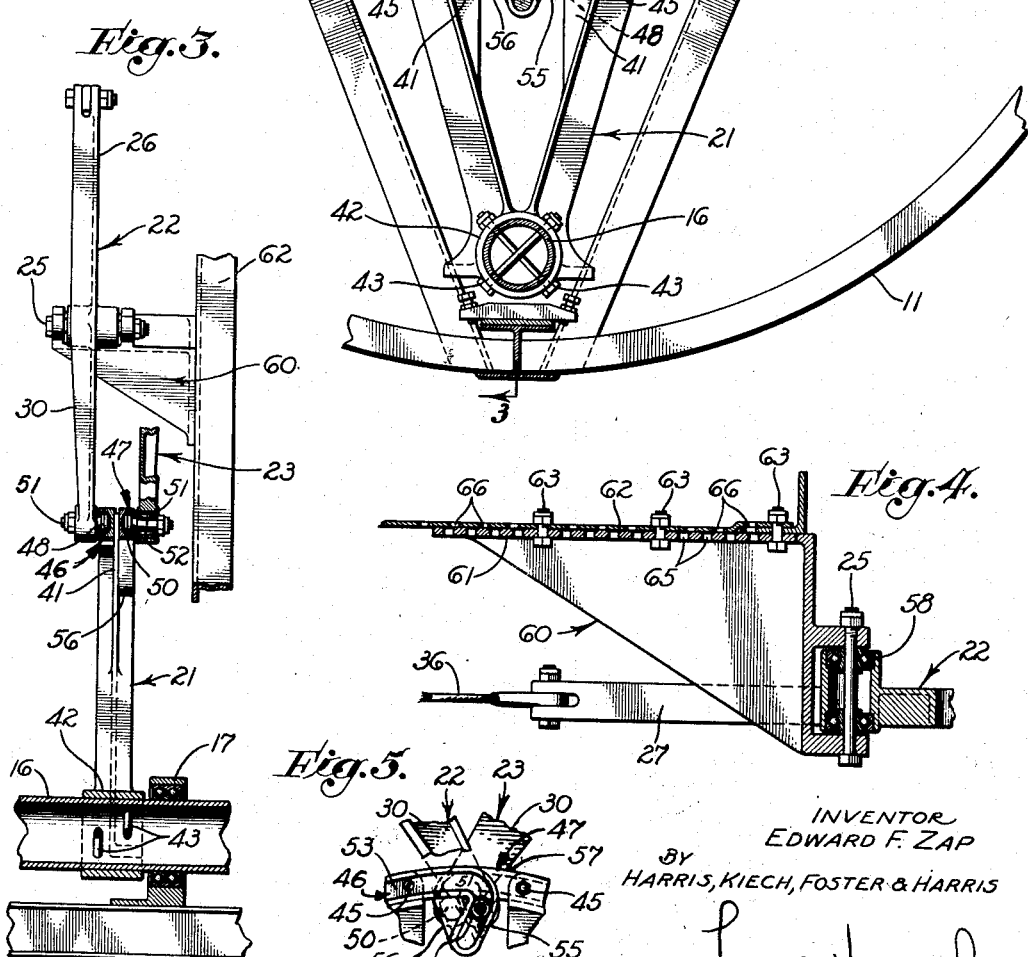
INVENTOR
EDWARD F. ZAP
BY HARRIS, KIECH, FOSTER & HARRIS
ATTORNEYS Patented Feb. 1, 1944

2,340,446

UNITED STATES PATENT OFFICE 2,340,446

AILERON CONTROL

Edward F. Zap, Los Angeles, Calif.

Application July 7, 1941, Serial No. 401,319

3 Claims. (Cl. 244—83)

My invention relates to mechanical systems and mechanical arrangements for controlling ailerons or similar pairs of aerodynamic members that are moved by a common means such as the usual control stick for opposite flight-control effects.

The present invention has the same purpose and the same general function as the control arrangement set forth in my copending application Serial No. 383,570, entitled "Control system for airplanes," and will be described as designed to control the same type of aileron.

At some stages in the operation of ailerons of the type herein contemplated, it is required that one aileron be held immobile or locked in some positive and automatic manner while the other aileron is in a range of effective positions. One object of my invention is to provide a control arrangement that will cause each aileron to function effectively when required and will likewise provide a dwell to cause each aileron to be locked automatically against movement when required.

Other objects of my invention as set forth in my copending application include the following: to permit sensitivity of control immediately adjacent the neutral position of the control stick; to permit a relatively rapid increase in aileron angle as the control stick initially departs from its neutral position; to permit the aerodynamic forces to be perceptible to the pilot through the control system; to permit balancing of opposite aerodynamic forces in the control system throughout a central range of control stick positions; to provide a control system that is not critical in adjustment; and to provide a control system in which looseness of operating connections does not result in non-responsiveness of the control system.

The attainment of this group of objects under my concept involves what may be termed overlapping of the control zones of the control stick. Instead of having the neutral position of the control stick mark the precise dividing line between two opposite control zones for operation of the two opposite ailerons, I arrange for the control zones to overlap so that movement of the control stick in a central range causes both the two ailerons to move simultaneously. One of the objects of the present invention is to provide means for permitting adjustment of the control system with respect to the degree of such overlap.

Other objects and advantages of the invention will be apparent in my detailed description to follow.

My control system includes a first operating means rotatably responsive to the control stick, a second operating means responsive to the first operating means for actuating one of the ailerons, and a third operating means likewise responsive to the first operating means to actuate the other aileron. The invention is characterized by a certain mechanical relation between the first operating means on the one hand and each of the second and third operating means on the other hand. Taking the first operating means and the second operating means, by way of example, the characteristic relationship may be broadly described as involving the equivalent of a track means on one of the two operating means that is engaged by the other operating means, the track means having a portion concentric to the axis of rotation of the first operating means to cause a dwell in the operation of the second operating means and having a second portion non-concentric to said axis whereby movement of the first operating means may be transmitted to the second operating means.

In the drawings:

Fig. 1 is a diagrammatic view in perspective showing my invention embodied in an aileron control system in an aircraft;

Fig. 2 is a rear elevation of the central group of operating members in the system;

Fig. 3 is a view partly in elevation and partly in section taken as indicated by the line 3—3 of Fig. 2;

Fig. 4 is a section on an enlarged scale taken as indicated by the line 4—4 of Fig. 2;

Fig. 5 is a fragmentary view corresponding to a portion of Fig. 2 showing an alternative adjustment of the control system;

Fig. 6 is a rear elevation similar to Fig. 2 showing the central operating members in a second form of the invention;

Fig. 7 is a view similar to Fig. 6 of a third form of the invention; and

Fig. 8 is a fragmentary cross section on an enlarged scale taken as indicated by the line 8—8 of Fig. 7.

The airplane shown in Fig. 1 has two wings 10 extending outwardly from a fuselage 11 and for rolling control is provided with a left aileron generally designated 12 and a right aileron generally designated 13. For control of the two ailerons a conventional control stick 15 may be mounted on a longitudinal torque tube 16, the torque tube being rotatably supported by suitable bearings such as the bearing 17 shown in Fig. 3.

Each of the ailerons 12 and 13 shown in Fig. 1 is, by preference, constructed as specifically described in my previously mentioned copending application, but it will be understood that the control system is applicable to many other types of ailerons. For the purpose of the present disclosure, it is sufficient to state that each of the ailerons 12 and 13 comprises a curved panel 18 with a plate 20 extending rearward from its trailing edge. At the ineffective position of an aileron the panel 18 is retracted into a slot (not shown) in the upper surface of the airplane wing, and the trailing plate 20 overlies the upper surface of the wing adjacent the slot. Any suitable means such as tracks or rollers (not shown) is provided to guide each of the panels 18 through various effective positions at which the panel extends to various degrees into the air stream. Extension of such an aileron into the air stream above a wing tends to lower the wing and thereby tends to roll the aircraft on its longitudinal axis.

The aileron control system shown in Figs. 1, 2, and 3 includes a first operating means in the form of a rocker arm generally designated 21 that is adapted to rotate about a longitudinal axis in response to lateral movement of the control stick 15. In the depicted arrangement, the rocker arm 21 is mounted on the torque tube 16 to rotate about the axis of the torque tube 16. Mechanically responsive to the first operating means or rocker arm 21 is a second operating means generally designated 22 for actuating the left aileron 12, and likewise responsive is a third operating means generally designated 23 for operating the right-hand aileron 13. Each of the second and third operating means 22 and 23 is mounted on the aircraft for a predetermined pattern of movement, for example, simple rotary movement or simple rectilinear movement. In the present and preferred arrangement, each of the operating means 22 and 23 is mounted on a pivot bolt 25 for rotary movement and comprises a crank with three arms, upper and lower arms 26 and 27 for transmitting movement to the corresponding aileron, and an operating arm 30. For convenience, the second operating means 22 which actuates the left aileron 12 will be referred to as the primary crank for the left aileron, and the third operating means 23 for operating the right aileron 13 will be referred to as the primary crank for the right aileron.

To operate each of the ailerons 12 and 13 in response to movement of the corresponding primary crank 22 or 23, I may employ a secondary three-arm crank 31 in each wing near the corresponding aileron. As indicated in Fig. 1, each of the secondary cranks 31 has a rearward arm 32 operatively connected by a cable 33 to the upper arm 26 of the corresponding primary crank 22 or 23, and has a forward arm 35 that is operatively connected by a cable 36 to the lower arm 27 of the corresponding rotary crank, the two cables being crossed and being guided by suitable pulleys 37. A third arm 38 of each of the secondary cranks 31 is connected to the corresponding aileron by an operating rod 40. It is apparent that clockwise rotation of the left primary crank 22, as viewed in the drawings, will cause corresponding counterclockwise movement of the secondary crank 31 in the left wing to cause the left aileron 12 to be extended, and in similar manner counterclockwise movement of the primary crank 23 for the right aileron will cause extension of the right aileron 13.

Turning to Figs. 2 and 3 for more specific details of the construction, the drawings show that the rocker arm 21 on the torque tube 16 may be in the form of a casting providing a web or plate portion 41 at its outer end. The casting has a cylindrical portion 42 that embraces the torque tube 16 and is fixedly attached thereto by diametrically disposed bolts 43. Mounted on the rear face of the web portion 41 of the rocker arm 21 (the near face in Fig. 2) by suitable bolts 45 is a track generally designated 46 for cooperation with the primary crank 22 and mounted on the front face of the web by similar bolts is a second track generally designated 47 for cooperation with the primary crank 23. Each of the two tracks 46 and 47 forms a channel U-shaped in cross section into which extends a suitable complementary connecting means from the corresponding primary crank. In the particular construction shown in the drawings, the connecting means cooperating with the rear track 46 is a suitable roller 48 (Fig. 3) carried by the primary crank 22, and the connecting means cooperating with the front track 47 is a similar roller 50 carried by the primary crank 23. As indicated in Fig. 3, each of the rollers 48 and 50 may be carried by a small stub shaft 51 that is journaled in a suitable bearing 52 in the operating arm 30 of the corresponding primary crank.

The track 46 on the rear face of the rocker arm 21 has a left portion 53 concentric to the axis of the torque tube 16 and a right portion 55 that turns downward in a direction non-concentric to the axis of the torque tube. When the control stick 15 is at its central position, the various parts being as indicated in Fig. 2, the roller 48 in the track 46 is at or near the juncture of the two portions 53 and 55 of the track. Substantial movement of the control stick to the left resulting in equivalent leftward movement of the rocker arm 21 causes the roller 48 to move downward along the non-concentric portion 55 of the track and thereby causes the primary crank 22 to rotate clockwise to extend the left aileron 12. Contrary movement of the control stick from the neutral position to swing the rocker arm 21 to the right causes relative movement of the roller 48 along the concentric portion 53 of the track 46 and thereby locks the primary crank 22 against rotation by virtue of the fact that any rotation would necessitate departure of the roller from the line of curvature defined by the concentric portion of the track.

The forward track 47 on the rocker arm 21 cooperating with the second roller 50 is similar to the rearward track but is oppositely disposed in that the left portion 56 of the track is non-concentric to the axis of the torque tube, and the right portion 57 is concentric to the torque tube axis. It is apparent that rightward movement of the control stick 15 to swing the rocker arm 21 clockwise causes the roller 50 to follow the non-concentric position of the track to rotate the primary crank 23 in a counterclockwise direction and that opposite movement of the control stick from neutral position locks the primary crank 23 against rotation. Substantial movement of the control stick in either direction away from its normal neutral position causes one of the two ailerons to be extended and simultaneously locks the other aileron in retracted position.

In the particular adjustment of the control mechanism illustrated by Fig. 2, whenever the control stick is at its neutral position, the two rollers 48 and 50 are located approximately at the junctures of the concentric and non-concentric portions of the corresponding tracks 46 and 47. If, as in some practices of my invention, it is desired to have the control zones of the control stick overlap for the purpose of achieving certain advantages, the control system may be adjusted in the manner indicated by Fig. 5. In Fig. 5, which represents the neutral position of the control stick 15, each of the rollers 48 and 50 is in the non-concentric portion of the corresponding track at an appreciable distance from the juncture of the non-concentric and concentric portions of the track. Such an adjustment of the control system results in each aileron being normally extended to an appreciable degree at the neutral position of the control stick.

If the control stick is moved to the right, as viewed in Fig. 2, with the control mechanism adjusted in the manner shown in Fig. 5, the result will be two distinct stages of aileron operation. In the first stage of rightward movement from the neutral position of the control stick, the near roller 48 carried by the left crank 22 initially moves up the non-concentric portion 55 of the track 46 to the juncture between the non-concentric portion 55 and the concentric portion 53, this initial movement of the roller 48 causing corresponding initial lowering of the left aileron. In this first stage of leftward movement, simultaneously the far roller 50 controlling the right crank 23 moves down the non-concentric portion 56 of the track 47, thereby causing corresponding upward movement of the right aileron. In this first stage of rightward movement, then, the two ailerons move oppositely.

In the second stage, of rightward movement of the control stick from its neutral position, the roller 48 controlling the left crank 22 moves into the concentric portion 53 of the track 46, thereby immobilizing the left aileron and meanwhile the roller 50 controlling the right crank 23 continues to move down the non-concentric portion 56 of the track 47, thereby continuing the lifting of the right aileron. In this second stage of rightward movement of the control stick, then, one aileron is stationary while the other aileron moves.

If the whole range of movement of the control stick is considered, the aileron action may be regarded as divided into three stages. Thus, if the control stick is swung from its extreme left position to its extreme right position to cover the whole range of its movement, there will be a first stage of operation in which the left aileron will will move downward from its uppermost position while the right aileron will be immobilized, a second stage of operation in which the left aileron will continue to move downwardly and simultaneously the right aileron will rise from its lowermost position, and a third stage in which the left aileron will be immobilized at its lowermost position while the right aileron continues to rise to its uppermost position.

The described mode of aileron operation has certain important advantages.

In the first place, when the pilot swings the control stick by a substantial amount in either direction from neutral, thereby engendering aerodynamic forces of relatively large magnitude, one of the ailerons is mechanically locked to avoid transmitting those forces to the control stick.

In the second place, throughout a central portion of the range of movement of the control stick, both ailerons freely transmit forces to the control stick, the forces from the two ailerons being balanced against each other. This balancing of the opposed forces reduces the exertion required on the part of the pilot for manipulation of the control stick and gives the pilot a "feel" of his ship. Even a slight fleeting predominance of force from one aileron over the force from the opposite aileron is perceptible to the pilot so long as the control stick is in the normal central portion of its range of movement. If the two opposite forces from the ailerons are precisely balanced with the control stick substantially at its neutral position, movement of the control stick in one direction by the pilot for the purpose of executing a maneuver results in upsetting the balance and the control stick therefore resists such movement. This resistance gives the pilot some indication of the relative magnitudes of the aileron forces and is conducive to skillful flying.

In the third place, in the central portion of the control stick range of movement, the airplane is greatly responsive to the control stick because the two ailerons move simultaneously in opposite directions in response to oscillation of the control stick. A change in angle of the control stick of one degree while the control stick is in the central portion of its range of movement produces twice the aileron effect as a change of one degree in the position of the control stick while the control stick is outside of this central protion.

One of the features of the present invention is the conception of so constructing the control system as to permit adjustment in the overlap of the control zones of the control stick. Any means of adjustment may be provided that permits relative movement of the two rollers 48 and 50 with respect to the corresponding tracks 46 and 47 independently of movements of the rocker arm 21. Thus the tracks 46 and 47 may be adjustable on the rocker arm 21, or the rollers 48 and 50 may be adjustable relative to the primary cranks 22 and 23, or the primary cranks may be bodily movable for such adjustment. In my preferred arrangement, I provide for bodily movement of the two primary cranks 22 and 23.

As best shown in Fig. 4, each of the primary cranks 22 and 23 is mounted by a suitable bearing 58 on one of the previously mentioned pivot bolts 25 and the pivot bolt in turn is carried by a bracket 60. A base 61 of the bracket 60 lies against a complementary support member 62 that is unitary with the aircraft structure, the base of the bracket being secured to the support member by suitable means such as bolts 63. Rivets may be substituted for the bolts if desired. To receive the bolts 63, the base 61 of the bracket is provided with a series of holes 65 of given spacing, and the support member 62 is provided with a complementary series of holes 66 of different spacing, the arrangement being such that various holes of one series register with various holes of the other series at different positions of adjustment of the bracket 60 relative to the support member 62. For example, the holes 65 in the base member may be one-fourth of an inch in diameter and spaced at one-half inch center to center, while the holes 66 in the support member may be one-fourth of an inch in diameter and spaced at five-eighths of an inch center to center. In such an arrangement the bracket 60 may be moved through a number of successive positions by shifts of one-eighth inch and at each position pairs of holes at two inch spacing will register to receive the bolts 63. Whenever a change is desired in the overlapping relation of the control zones of the control stick, it is necessary merely to remove the bolts 63 anchoring the two brackets and then to replace the bolts at new positions in the two brackets.

In the second form of my invention shown in Fig. 6, a rocker arm 70 on the torque tube 16 corresponding to the previously described rocker arm 21 carries on its rear face a track generally designated 71 comprising two sections in end to end abutment, the two sections being separately attached to the rocker arm by suitable bolts 72. The track 71 has a central portion 73 cencentric to the axis of the torque tube and has two end portions 75 and 76 that turn downward in directions non-concentric to the torque tube axis. In this second form of the invention, a primary crank 77 for actuating the left arm is placed on the right side of the rocker shaft instead of the left and a similar primary crank 78 for the right aileron is located to the left of the rocker arm. Each of these two primary cranks 77 and 78 has upper and lower arms 80 and 81 respectively for connection by suitable cables 82 and 83 to the previously described secondary cranks 31 in the airplane wings. Each of the upper arms 80 is connected to the forward arm 35 of the corresponding secondary crank 31, and each of the lower arms 81 of the primary crank is likewise connected to the rearward arm 32 of the secondary crank. Counterclockwise rotation of the primary crank 77 causes similar clockwise rotation of the corresponding secondary crank 31 in the left wing, and clockwise rotation of the primary crank 78 causes corresponding clockwise rotation of the corresponding crank 31 in the right wing. Each of the primary cranks 77 and 78 may be mounted in the manner previously described on a pivot bolt 85 carried by an adjustable bracket 86.

In Fig. 6, representing the normal neutral position of the control stick 15, a roller 87 on an operating arm 88 of the primary crank 77 engages the track 71 at the entrance to the end portion 75 of the track, and a roller 89 on an operating arm 90 of the primary crank 78 is likewise in engagement with the track at the entrance to the end portion 76 of the track. Substantial movement of the rocker arm 70 to the left, as viewed in Fig. 6, causes the roller 87 to follow the end portion 75 of the track, thereby causing the primary crank 77 to rotate counterclockwise to extend the left aileron 12, and meanwhile the roller 89 of the primary crank 78 moves into the central concentric portion 73 of the track to lock the right aileron in retracted disposition. Conversely, substantial movement of the rocker arm to the right causes clockwise rotation of the primary crank 78 to extend the right aileron 13 and causes the left aileron to be locked in retracted position. It is apparent that the two brackets 86 may be adjusted in the manner heretofore described to cause the two operating zones of the control stick to overlap to various degrees.

In the third form of the invention shown in rear view in Fig. 7 and in section in Fig. 8, a rocker arm 91 corresponding to the previously mentioned rocker arm 70 is mounted on the torque tube 16 for rotation about the torque tube axis. To the right of the rocker arm 91 a primary crank 92 corresponding to the primary crank 77 of Fig. 6 is mounted by a pivot bolt 93 on an adjustable bracket 95, and to the left of the rocker arm a primary crank 96 corresponding to the previously mentioned primary crank 78 is mounted by a pivot bolt 93 on a second adjustable bracket 95. The primary crank 92 that operates the left aileron and the primary crank 96 that operates the right aileron are operatively connected to corresponding secondary cranks in the airplane wings as previously described with reference to Fig. 6, an upper arm 97 of each primary crank being connected by a cable 98 to the forward arm 35 of the secondary crank and a lower arm 100 of each primary crank being connected by a cable 101 to the rearward arm 32 of the corresponding secondary crank.

The rocker arm 91 carries a rearward roller 102 for controlling an operating arm 103 of the primary crank 92 and a forward roller 105 coaxial with the rearward roller for controlling an operating arm 106 of the primary crank 96. The rearward roller 102 is in engagement with a track 107 that is mounted on the operating arm 103 by suitable bolts, and in similar manner the forward roller 105 engages a track 110 on the operating arm 106. As clearly indicated in Fig. 7, each of the tracks 107 and 110 has a portion 111 concentric to the axis of the torque tube 16 and an end portion 112 that is non-concentric to the torque tube axis. Movement of the rocker arm 91 to the left, as viewed in Fig. 7, causes the primary crank 92 to rotate counterclockwise for extension of the left aileron and movement of the rocker arm 91 to the right from neutral position causes the primary crank 96 to rotate clockwise to extend the right aileron 13. It is apparent that this third arrangement will operate the two ailerons in the same manner as the second arrangement depicted in Fig. 6 and may be adjusted in the same manner.

Within the scope of my underlying concept, various changes and substitutions may be made in the desired arrangement without departing from the essence of the invention, and I specifically reserve the right to all such departures that properly come within the scope of my appended claims.

I claim as my invention:

1. A control system for an aircraft comprising in combination: two aerodynamic members disposed on the aircraft for opposite control effects; a manual control member movable from a neutral position in one direction through a first control zone and in the opposite direction through a second control zone for opposite flight-control effects; a first means pivotally movable about an axis in response to movement of said control member; a second means operatively connected to one of said aerodynamic members; a track means on one of said first and second means; a connecting means on the other of said first and second means in engagement with said track means for relative movement along the track means, a portion of said track means being non-concentric to said axis to cooperate with said connecting means to actuate said second means over a portion of the range of movement of said first means, another portion of said track means being concentric to said axis to cooperate with said connecting means to lock said second means against movement over a second portion of the range of movement of said first means; a third means operatively connected to the other of said aerodynamic members; a second track means on one of said first and third means; and a second connecting means on the other of said first and third means in engagement with said second track means for relative movement along said second track means, a portion of said second track means being non-concentric to said axis to cooperate with said second connecting means to actuate said third means over a portion of the range of movement of said first means, another portion of said second track means being concentric to said axis to cooperate with said second connecting means to lock said third means against movement over a second portion of the range of movement of said first means, said two track means being oppositely disposed, said two connecting means having normal positions in the non-concentric portions of the corresponding track means spaced from the concentric portions thereof when said manual control member is in said neutral position whereby both said second and third operating means are responsive in opposite operative directions to initial movement of said manual control member in either direction from said neutral position of the manual control member, and whereby continuation of such movement results in subsequent immobilization of one of said second and third operating means and continued movement of the other.

2. A control system for an aircraft comprising in combination: two aerodynamic members disposed on the aircraft for opposite control effects; a manual control member movable from a neutral position in one direction through a first control zone and in the opposite direction through a second control zone for opposite flight-control effects; a first means pivotally movable about an axis in response to movement of said control member; a second means operatively connected to one of said aerodynamic members; a track means on one of said first and second means; a connecting means on the other of said first and second means in engagement with said track means for relative movement along the track means, a portion of said track means being non-concentric to said axis to cooperate with said connecting means to actuate said second means over a portion of the range of movement of said first means, another portion of said track means being concentric to said axis to cooperate with said connecting means to lock said second means against movement over a second portion of the range of movement of said first means; a third means operatively connected to the other of said aerodynamic members; a second track means on one of said first and third means; a second connecting means on the other of said first and third means in engagement with said second track means for relative movement along said second track means, a portion of said second track means being non-concentric to said axis to cooperate with said second connecting means to actuate said third means over a portion of the range of movement of said first means, another portion of said second track means being concentric to said axis to cooperate with said second connecting means to lock said third means against movement over a second portion of the range of movement of said first means, said two track means being oppositely disposed, said two connecting means having normal positions in the non-concentric portions of the corresponding track means spaced from the concentric portions thereof when said manual control member is in said neutral position whereby both said second and third operating means are responsive in opposite operative directions throughout a central portion of the range of movement of said manual control member, and whereby movement of said manual control member out of said central portion of its range results in immobilization of one of said second and third operating means and continued movement of the other; and means to vary the extent of said central portion of the range of movement of said control member, said varying means comprising means to cause said normal positions of said connecting means to shift along said non-concentric portions of the corresponding track means.

3. A control system for an aircraft comprising in combination: two aerodynamic members disposed on the aircraft for opposite control effects; a manual control member movable from a neutral position in one direction through a first control zone and in the opposite direction through a second control zone for opposite flight-control effects; a first means pivotally movable about an axis in response to movement of said control member; a second means operatively connected to one of said aerodynamic members; a track means on one of said first and second means; a connecting means on the other of said first and second means in engagement with said track means for relative movement along the track means, a portion of said track means being non-concentric to said axis to cooperate with said connecting means to actuate said second means over a portion of the range of movement of said first means, another portion of said track means being concentric to said axis to cooperate with said connecting means to lock said second means against movement over a second portion of the range of movement of said first means; a third means operatively connected to the other of said aerodynamic members; a second track means on one of said first and third means; a second connecting means on the other of said first and third means in engagement with said second track means for relative movement along said second track means, a portion of said second track means being non-concentric to said axis to cooperate with said second connecting means to actuate said third means over a portion of the range of movement of said first means, another portion of said second track means being concentric to said axis to cooperate with said second connecting means to lock said third means against movement over a second portion of the range of movement of said first means, said two track means being oppositely disposed, said two connecting means having normal positions in the non-concentric portions of the corresponding track means spaced from the concentric portions thereof when said manual control member is in said neutral position whereby both said second and third operating means are responsive in opposite operative directions throughout a central portion of the range of movement of said manual control member, and whereby movement of said manual control member out of said central portion of its range results in immobilization of one of said second and third operating means and continued movement of the other; and stationary means pivotally supporting said second and third operating means respectively, said stationary means being adjustably movable to vary said normal positions of the connecting means along said non-concentric portions of the corresponding track means, thereby to vary the extent of said central portion of the range of movement of said manual control member.

EDWARD F. ZAP.